(12) United States Patent
Hayashide et al.

(10) Patent No.: US 7,855,815 B2
(45) Date of Patent: Dec. 21, 2010

(54) LIGHT GUIDE OPTICAL SYSTEM, DOCUMENT ILLUMINATING DEVICE USING SAME, AND IMAGE READING APPARATUS USING SAME

(75) Inventors: Tadao Hayashide, Utsunomiya (JP); Takayuki Sugiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 12/212,107

(22) Filed: Sep. 17, 2008

(65) Prior Publication Data
US 2009/0080038 A1  Mar. 26, 2009

(30) Foreign Application Priority Data
Sep. 25, 2007  (JP) .............................. 2007-247468

(51) Int. Cl.
*H04N 1/04* (2006.01)
(52) U.S. Cl. ...................... 358/484; 358/475; 358/483; 358/497; 358/474; 250/227.11; 250/208.1; 362/551
(58) Field of Classification Search ................ 358/484, 358/475, 509, 483, 482, 512–514, 497, 494, 358/474; 362/551, 555; 250/227.11, 555; 399/220, 221; 355/67–70
See application file for complete search history.

(56) References Cited

U.S. PATENT DOCUMENTS

| | | | | |
|---|---|---|---|---|
| 5,196,950 A | * | 3/1993 | Fukoka et al. ................ | 358/475 |
| 5,313,289 A | * | 5/1994 | Nagane et al. ............... | 358/475 |
| 5,696,607 A | * | 12/1997 | Yamana et al. ............... | 358/474 |
| 5,810,463 A | * | 9/1998 | Kawahara et al. ............ | 362/601 |
| 6,469,808 B1 | * | 10/2002 | Onishi et al. ................. | 358/475 |
| 7,088,905 B1 | * | 8/2006 | Nemoto et al. ............... | 385/147 |
| 7,436,556 B2 | * | 10/2008 | Onishi et al. ................. | 358/484 |
| 7,717,598 B2 | * | 5/2010 | Kakizaki et al. ............. | 362/551 |
| 7,760,403 B2 | * | 7/2010 | Sakurai ........................ | 358/484 |
| 2004/0004669 A1 | * | 1/2004 | Fang ............................ | 348/345 |
| 2010/0012852 A1 | * | 1/2010 | Higashitani et al. ........ | 250/458.1 |
| 2010/0123008 A1 | * | 5/2010 | Lo et al. ....................... | 235/454 |

FOREIGN PATENT DOCUMENTS

JP  07-203128 A  8/1995
JP  2005-156600 A  6/2005

\* cited by examiner

*Primary Examiner*—Cheufkan Lee
(74) *Attorney, Agent, or Firm*—Canon U.S.A., Inc. I.P. Division

(57) ABSTRACT

A light guide optical system guides a plurality of light beams emitted from a plurality of point light sources arranged linearly to a predetermined surface. The light guide optical system has a plurality of optical surfaces arranged periodically in the arrangement direction of the plurality of point light sources. Each of the plurality of optical surfaces has power in the arrangement direction of the plurality of point light sources.

7 Claims, 4 Drawing Sheets

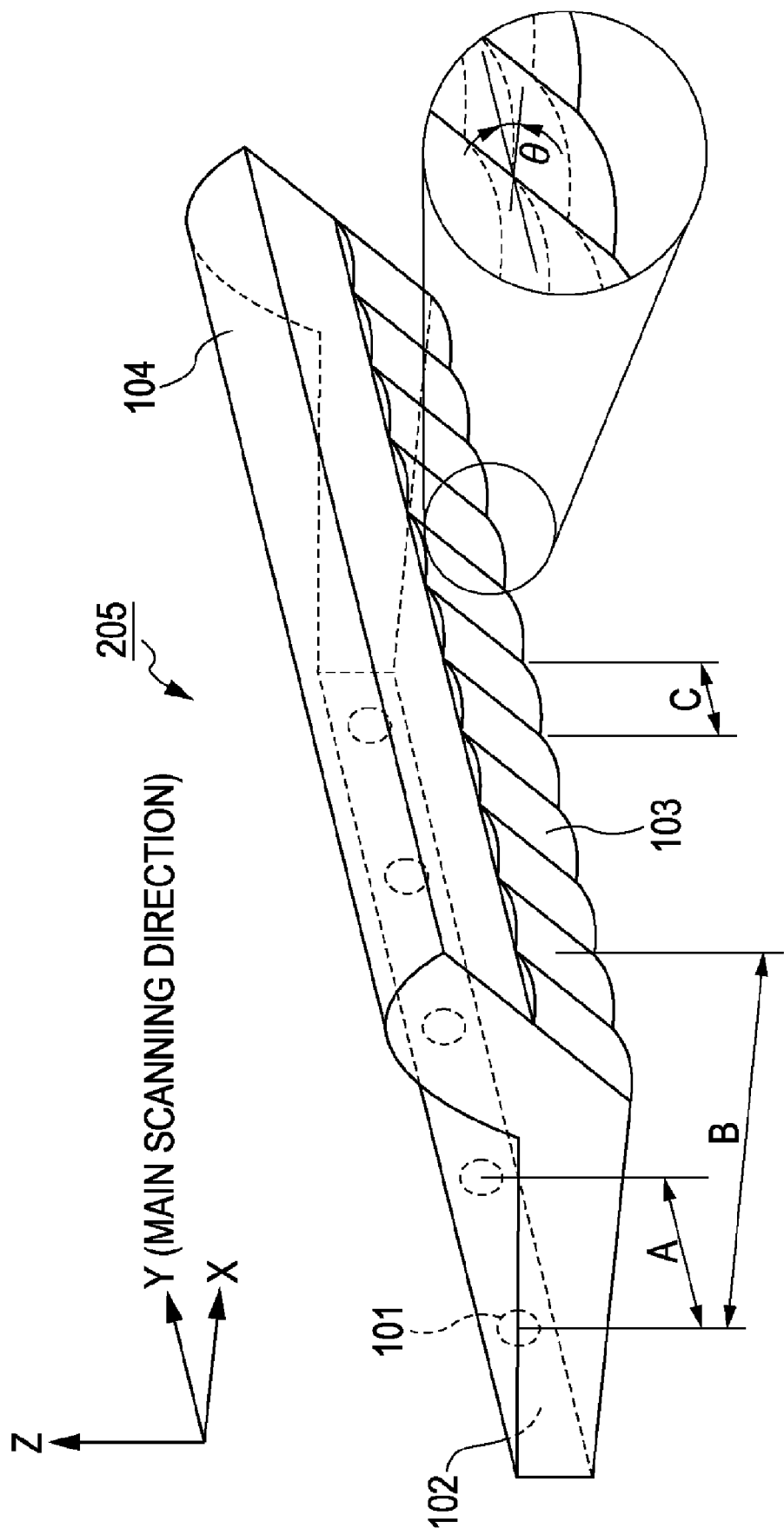

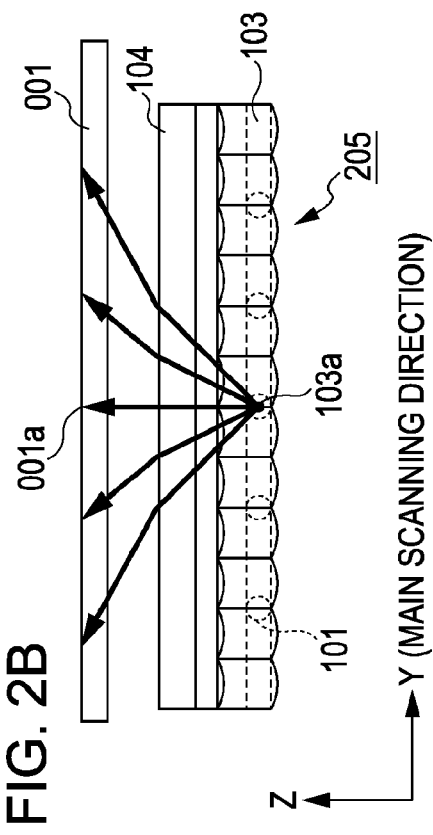
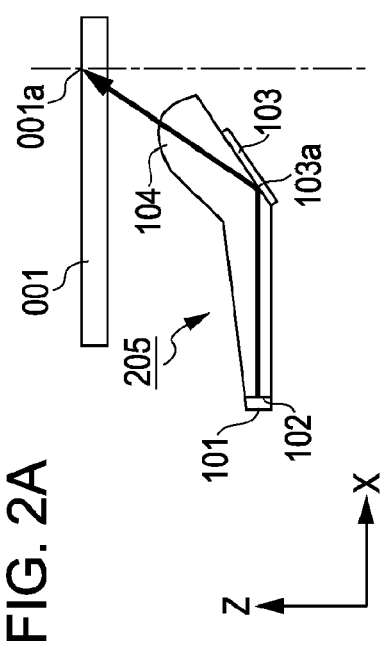
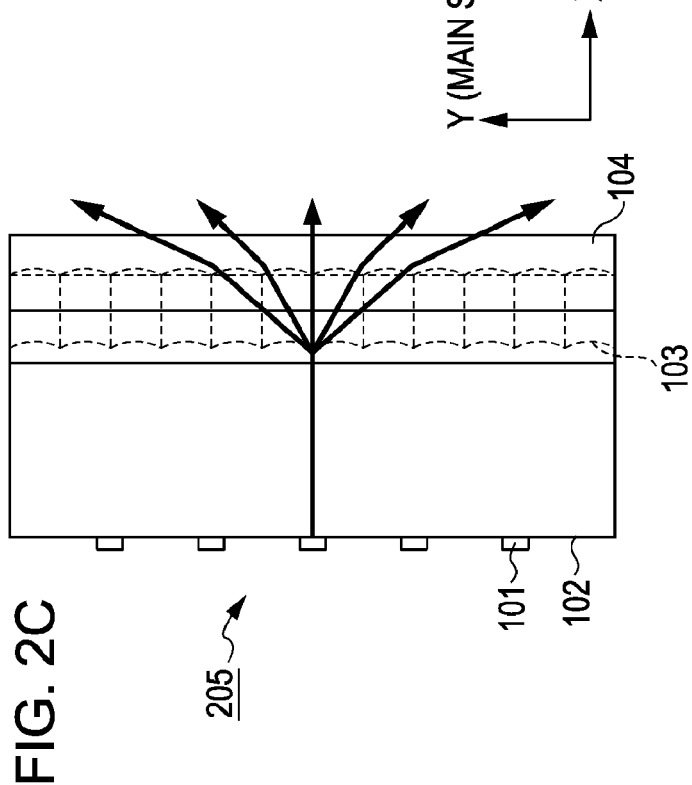

LIGHT GUIDE OPTICAL SYSTEM, DOCUMENT ILLUMINATING DEVICE USING SAME, AND IMAGE READING APPARATUS USING SAME

BACKGROUND OF THE INVENTION

1. Field of the Invention

The present invention relates to a light guide optical system, a document illuminating device using the same, and an image reading apparatus using the same. More specifically, the present invention relates to an image reading apparatus that illuminates a document surface and performs image reading in a line-sequential manner, for example, an image scanner, a copying machine, or a facsimile.

2. Description of the Related Art

In general, a document illuminating device used by an image reading apparatus that illuminates a document surface and performs image reading in a line-sequential manner, for example, an image scanner, a copying machine, or a facsimile illuminates a document surface using a tubular (linear) light source such as a fluorescent lamp.

FIG. 5 is a sectional view of a main portion of a typical image reading apparatus. Illuminating light emitted from a tubular light source 005 illuminates a document placed on a document table glass 001. Light beams reflected on the document surface and having image information are reflected on a plurality of reflecting mirrors 006 and are then caused by an imaging lens 007 to form an image on one-dimensional photoelectric conversion elements (CCDs) 008 arranged in the main scanning direction.

A carriage 004 is moved by a subscanning-direction drive unit 009 and reads a two-dimensional image of the document in a line-sequential manner. In general, a cold cathode fluorescent tube or a xenon tube is used as the tubular light source 005. Xenon tubes are stable in light quantity and are therefore widely used by apparatuses for business use but are relatively expensive. Therefore, apparatuses for home use, whose unit prices are low, use cold cathode fluorescent lamps, which are inexpensive.

However, cold cathode fluorescent lamps are unstable in light quantity. Therefore, development of a linear illuminating device that is inexpensive and stable in light quantity is required.

As a result of recent technological development, luminous efficiency of light emitting diodes (LEDs) has been improved, and a technology to make a linear illuminating device with LEDs has been developed.

When point light sources such as LEDs (light emitting diodes) are used as light sources, a plurality of point light sources are arranged in the main scanning direction.

When a reading surface such as a document surface is directly irradiated with light beams emitted from each of a plurality of point light sources, the illuminance is not uniform in the main scanning direction, and the density of the read image is not uniform.

To restrain the non-uniformity of illuminance in an image reading apparatus using a plurality of point light sources, various technologies have been developed (for example, Japanese Patent Laid-Open Nos. 2005-156600 and 7-203128).

For example, Japanese Patent Laid-Open No. 2005-156600 discloses to eliminate the non-uniformity of illuminance by providing a light diffusing portion that randomly diffuse light between light sources and an object (document).

However, the technology described in Japanese Patent Laid-Open No. 2005- 156600 diffuses light beams randomly and therefore even toward the outside of a predetermined region to be illuminated, and therefore suffers from low light use efficiency of light beams emitted from the light sources.

In addition, a flare phenomenon, in which light beams reflected on a region other than the region to be illuminated fall on the region to be illuminated, occurs and can degrade the quality of the image reading apparatus.

Document illuminating devices used in image reading apparatuses need to read a document with uniform quality, and therefore it is desirable that the angular characteristics of light beams incident on the document surface be uniform.

Therefore, it is necessary to illuminate individual positions in the main scanning direction on the document surface from many directions, and to increase the illuminating angle so that a plurality of light sources illuminate a broader range.

However, increasing the illuminating angle of diffuse light beams diffused by a light diffusing portion causes an absorption reflection phenomenon in the light diffusing portion, and further lowers the light use efficiency.

SUMMARY OF THE INVENTION

The present invention provides a light guide optical system using a plurality of point light sources arranged linearly in which the illumination quality such as illuminance is uniformed without increasing the diffusion toward the outside of a region to be illuminated.

In an aspect of the present invention, a document illuminating device includes a plurality of point light sources arranged in a main scanning direction, and a light guide optical system that guides a plurality of light beams emitted from the plurality of point light sources to a document surface. The light guide optical system has an entrance surface through which the plurality of light beams emitted from the plurality of point light sources enter, a plurality of curved reflecting surfaces that reflect the plurality of light beams having passed through the entrance surface and that are periodically arranged in the main scanning direction, and an exit surface through which the plurality of light beams reflected on the plurality of curved reflecting surfaces exit toward the document surface. Each of the plurality of curved reflecting surfaces has a curvature in the main scanning direction.

According to the present invention, even in a light guide optical system that guides a plurality of light beams emitted from a plurality of point light sources arranged linearly to a predetermined surface, the illumination quality such as illuminance can be uniformized without increasing the diffusion toward the outside of a region to be illuminated.

That is, when the curved reflecting surfaces of the present invention are used, the plurality of light beams emitted from the plurality of point light sources are reflected and diffused in the arrangement direction of the plurality of point light sources.

Therefore, the illumination quality such as illuminance in a region to be illuminated can be uniformized without increasing the diffusion toward the outside of the region to be illuminated.

Further features of the present invention will become apparent from the following description of exemplary embodiments with reference to the attached drawings.

BRIEF DESCRIPTION OF THE DRAWINGS

FIG. 1 is a perspective view showing a light guide optical system according to an embodiment of the present invention.

FIGS. 2A, 2B, and 2C are a side view, a front view, and a top view, respectively, of the light guide optical system of FIG. 1.

DESCRIPTION OF THE EMBODIMENTS

Figure 3:
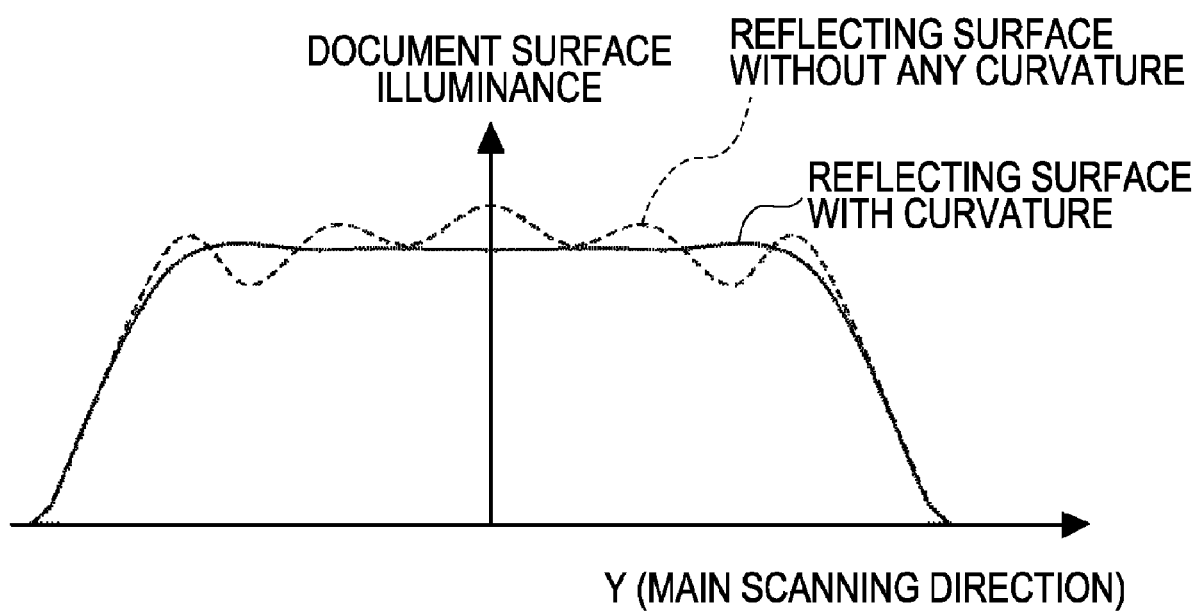
FIG. 3 is an illuminance distribution graph showing the effect of the embodiment of the present invention illustrated in FIGS. 1, 2A, 2B, and 2C.

A document illuminating device 205 of the present invention will be described with reference to FIGS. 1 to 4.

In FIGS. 1, 2B, and 2C, the direction Y is an arrangement direction in which a plurality of LEDs (light emitting diodes) 101 are arranged linearly, and will be referred to as main scanning direction.

In FIGS. 1, 2A, and 2C, the X direction is a direction in which a carriage 004 (illustrated in FIG. 4) moves relative to a document table glass 001, and will be referred to as subscanning direction. A direction perpendicular to the X and Y directions will be referred to as Z direction.

FIG. 1 is a perspective view of a light guide optical system (light guide member) of the present invention. The plurality of LEDs (light emitting diodes) 101 arranged in the main scanning direction are disposed on an entrance surface 102 of the light guide optical system.

A plurality of light beams emitted from the plurality of point light sources (LEDs) 101 are totally reflected at reflecting points on a plurality of curved reflecting surfaces 103 and exit through an exit surface 104 toward the document surface.

The light guide optical system is formed of acrylic resin by injection molding.

A more detailed description will be made with reference to FIGS. 2A, 2B, and 2C. FIG. 2A is a subscanning sectional view (Z-X sectional view) of a document illuminating device 205 of the present invention. FIG. 2B is a Z-Y sectional view of the document illuminating device 205 of the present invention. FIG 2C is a main scanning sectional view (Y-X sectional view) of the document illuminating device 205 of the present invention.

The plurality of point light sources (LEDs) 101 are arranged with an arrangement pitch of 9 mm. The width in the main scanning direction of the emitting region of each of the plurality of point light sources (LEDs) 101 is 1.0 mm. A plurality of light beams emitted from the plurality of point light sources (LEDs) 101 pass through the entrance surface 102.

The light beams are then reflected at reflecting points 103a on the plurality of curved reflecting surfaces 103 located 18 mm ahead, pass through the exit surface 104 of the light guide optical system, and reach document reading positions 001a on the document table glass 001. The shortest distance from the plurality of curved reflecting surfaces 103 to the document table glass 001 is 20 mm.

Each of the plurality of curved reflecting surfaces 103 is a cylinder surface that has a radius of curvature or 1.0 mm in the main scanning direction (and has finite power in the main scanning direction) and that is convex toward the outside of the light guide optical system (light guide member) and has positive power (refractive power) in the main scanning direction.

Each of the plurality of curved reflecting surfaces 103 has a radius of curvature of infinity in the subscanning direction (and has no power in the subscanning direction).

The arrangement pitch of the plurality of curved reflecting surfaces 103 is 0.6 mm. The maximum inclination angle $\theta$ formed by the main scanning direction and a tangent of each of the curved reflecting surfaces in the main scanning section is 17.5 degrees.

In FIG. 1, dashed lines show curved surfaces, and a solid line shows a tangent.

The light guide optical system (light guide member) has the plurality of optical surfaces (curved reflecting surfaces) 103 periodically disposed in the arrangement direction of the plurality of point light sources 101. Each of the plurality of optical surfaces 103 has power (refractive power) in the arrangement direction (main scanning direction).

Since the arrangement pitch of the plurality of optical surfaces disposed periodically is 0.6 mm and the spacing between the point light sources is 9 mm, the arrangement pitch of the plurality of optical surfaces disposed periodically is shorter than the spacing between the plurality of point light sources.

Each of the optical surfaces 103 disposed periodically is a curved reflecting surface having a curvature in the main scanning direction. In addition, each of the optical surfaces has positive power that converges incident light beams in the main scanning direction.

Therefore, in this embodiment, the illuminance distribution in the main scanning direction is more uniform compared to the case where each of a plurality of reflecting surfaces of a light guide optical system has no curvature, as shown in FIG. 3.

In FIG. 3, the illuminance distribution is uniform in the center and the right and left peripheries of the document illumination position. The document surface illuminance is constant in the main scanning direction (a flat line in FIG. 3).

In FIG. 3, the horizontal axis shows the document reading position (mm) in the main scanning direction, and the vertical axis shows the document surface illuminance. The vertical axis shows the relative illuminance when the document surface illuminance at the center (0 mm) of the document reading position is 1.

The trapezoidal distribution shown by a solid line is the illuminance distribution of the present invention (reflecting surface with curvature). When document reading is performed in the range of the upper base of the trapezoid, image reading can be performed with uniform illuminance.

In the case of the illuminance distribution of the conventional technology (reflecting surface without any curvature), the non-uniformity of illuminance needs to be corrected by image correction. However, heavy use of correction deteriorates the image quality.

Figure 4:
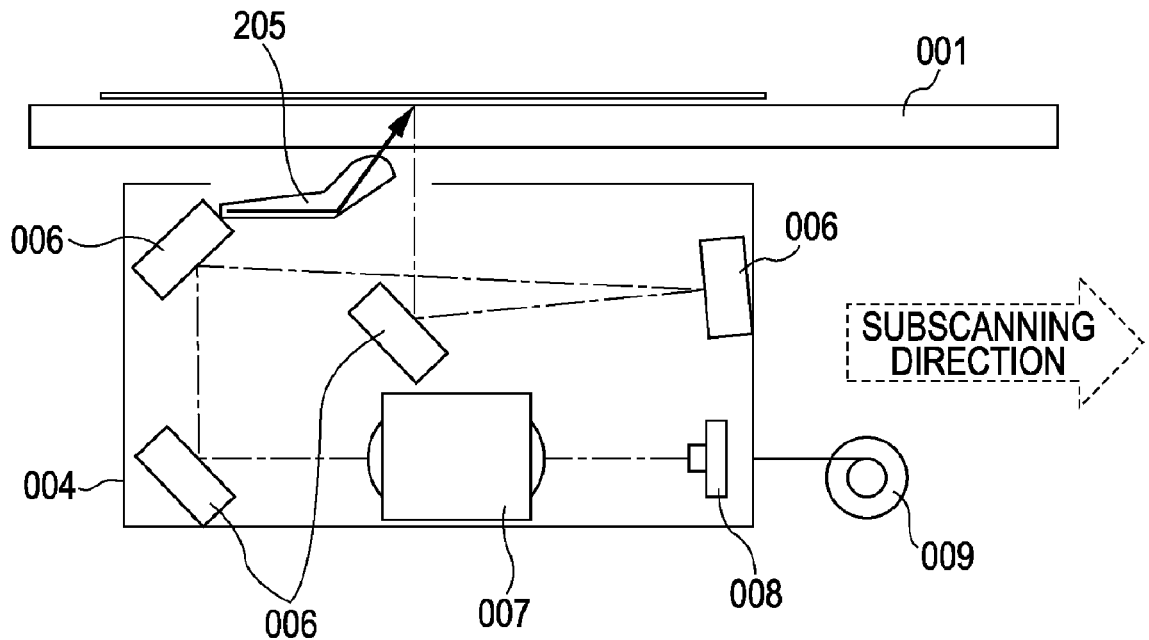
FIG. 4 is a sectional view of an image reading apparatus of the present invention.
Figure 5:
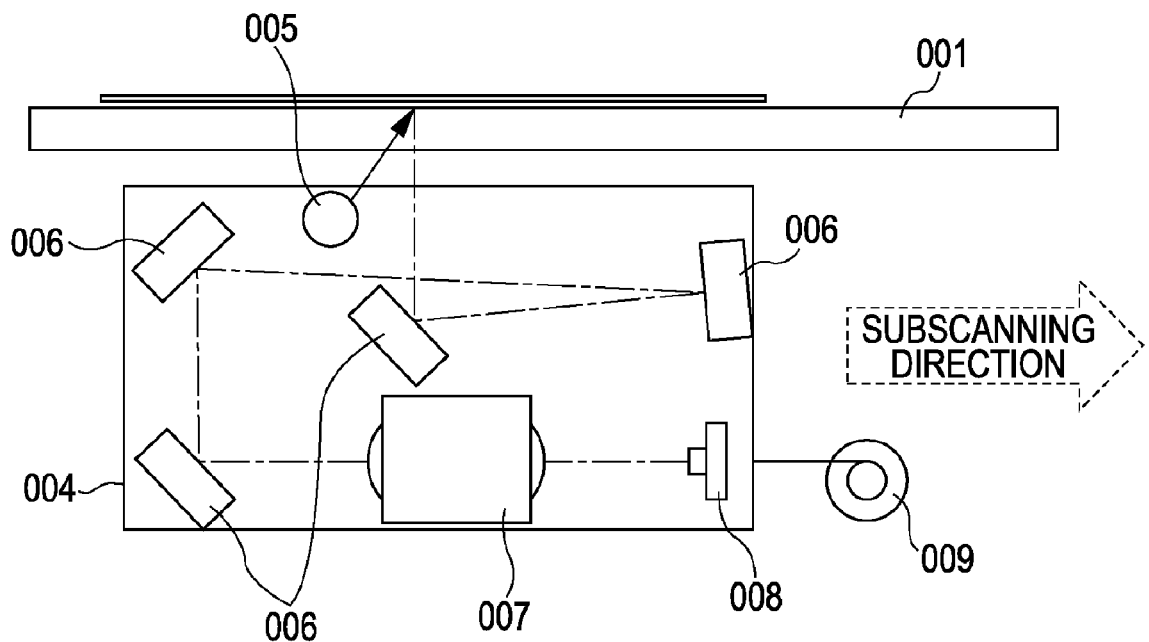
FIG. 5 is a sectional view of a conventional image reading apparatus.

FIG. 4 is a subscanning sectional view of an image reading apparatus of the present invention. Illuminating light beams emitted from the document illuminating device 205 of the present invention illuminate the surface of a document placed on a document table glass 001.

Reading light beams reflected on the document surface and having image information are reflected on a plurality of reflecting mirrors 006 and are then caused by an imaging lens 007 serving as an imaging optical system to form an image on one-dimensional photoelectric conversion elements (CCDs) 008 arranged in the main scanning direction.

A carriage 004 is moved by a subscanning-direction drive unit 009 and reads a two-dimensional image of the document in a line-sequential manner.

Referring now to FIGS. 1, 2A, 2B, 2C, 3, and 4, the maximum inclination angle formed by the main scanning direction and a tangent of each of the curved reflecting surfaces 103 in the main scanning section is denoted as $\theta$ (degrees).

The maximum arrangement pitch of the plurality of point light sources 101 is denoted as A (mm). The maximum distance between the entrance surface 102 and the curved reflecting surfaces 103 in the main scanning section is denoted as B (mm).

It is desirable that the following conditional expression be satisfied:

$$\frac{1}{3} \tan^{-1}(A/2B) < \theta < 28° \quad (1)$$

When the conditional expression (1) is satisfied, the illuminance distribution in the main scanning direction is more uniform compared to the case where each of a plurality of reflecting surfaces of a light guide optical system has no curvatures, as shown in FIG. 3.

The conditional expression (1) relates to uniformization of illuminance and improvement of the light use efficiency.

If the maximum inclination angle $\theta$ is less than the lower limit $\frac{1}{3} \tan^{-1}(A/2B)$, the non-uniformity of illuminance is significant. If the maximum inclination angle $\theta$ exceeds the upper limit 28°, the light quantity of light beams that can exist through the exit surface 104 decreases and the light use efficiency decreases.

It is more desirable that the following conditional expression (2) be satisfied:

$$\frac{1}{2} \tan^{-1}(A/2B) < \theta < 21° \quad (2)$$

In this embodiment, the conditional expression (1) is calculated as follows:

$$\frac{1}{3} \tan^{-1}(9/2*18) < 17.5 < 28°$$

$$4.7 < 17.5° < 28$$

Therefore, the condition is satisfied.

In the present invention, it is desirable that the following conditional expression be satisfied:

$$0.018 < C/D < 0.050 \quad (3)$$

where C (mm) is the arrangement pitch of the plurality of curved reflecting surfaces 103, and D (mm) is the light path length from the reflecting point of a light beam on the curved reflecting surfaces to the image reading position on the document surface. The conditional expression (3) shows the cost-effectiveness when the curved reflecting surfaces 103 are formed. When C/D is at least the lower limit 0.018, sufficient performance can be obtained.

When C/D is smaller than the lower limit 0.018, the needlessly large number of curved reflecting surfaces 103 increase the cost. When C/D exceeds the upper limit 0.050, the curved reflecting surfaces 103 cannot sufficiently improve the performance.

It is more desirable that the following conditional expression (4) be satisfied:

$$0.022 < C/D < 0.045 \quad (4)$$

In this embodiment, the conditional expression (3) is calculated as follows:

$$0.018 < C/D < 0.050$$

$$0.018 < 0.6/20 < 0.050$$

$$0.018 < 0.03 < 0.050$$

Therefore, the condition is satisfied.

Since the curved reflecting surfaces 103 are total reflection surfaces, the light guide optical system can be made of transparent material and therefore at low cost.

In addition, since the curved reflecting surface 103 is coated with a metal thin film having a reflectance of 70% or more, the following advantages can be obtained.

The angle of total reflection of a reflecting surface is limited. This can lower the degree of shape freedom of the light guide optical system. However, by adding a metal thin film as a reflecting surface, a high degree of shape freedom can be obtained. Therefore, although the cost increases slightly, reduction in size of the light guide optical system can be achieved.

In this embodiment, each of the plurality of curved reflecting surfaces 103 is convex toward the outside of the light guide optical system. However, in alternative embodiments of the present invention, they may be concave.

For example, each of the plurality of curved reflecting surfaces 103 may be a cylinder surface that is concave toward the outside of the light guide optical system (light guide member) and that has negative power in the main scanning direction. In the present invention, the light sources are not limited to LEDs. Any nonlinear light sources can be used as the plurality of point light sources of the present invention.

INDUSTRIAL APPLICABILITY

The present invention is suitable for an image reading apparatus that illuminates a document surface and performs image reading in a line-sequential manner, for example, and image scanner, a copying machine, or a facsimile.

While the present invention has been described with reference to exemplary embodiments, it is to be understood that the invention is not limited to the disclosed exemplary embodiments. The scope of the following claims is to be accorded the broadest interpretation so as to encompass all modification and equivalent structures and functions.

The application claims the benefit of Japanese Patent Application No. 2007-247468 filed Sep. 25, 2007, which is hereby incorporated by reference herein in its entirety.

What is claimed is:

1. A document illuminating device comprising:
   a plurality of point light sources arranged in a main scanning direction; and
   a light guide optical system that guides a plurality of light beams emitted from the plurality of point light sources to a document surface,
   wherein the light guide optical system has:
   an entrance surface through which the plurality of light beams emitted from the plurality of point light sources enter;
   a plurality of curved reflecting surfaces that reflect the plurality of light beams having passed through the entrance surface and that are periodically arranged in the main scanning direction; and
   an exit surface through which the plurality of light beams reflected on the plurality of curved reflecting surfaces exit toward the document surface; and wherein
   each of the plurality of curved reflecting surfaces has a curvature in the main scanning direction, and an arrangement pitch of the plurality of curved reflecting surfaces periodically arranged in the main scanning direction is shorter than a spacing in the main scanning direction between the plurality of point light sources.

2. The document illuminating device according to claim 1, wherein the following conditional expression is satisfied:

$$\tfrac{1}{3}\tan^{-1}(A/2B) < \theta < 28°,$$

where θ (degrees) is the maximum inclination angle formed by the main scanning direction and a tangent of each of the curved reflecting surfaces in the main scanning section, A (mm) is the arrangement pitch of the plurality of point light sources, and B (mm) is the maximum distance between the entrance surface and the curved reflecting surfaces in the main scanning section.

3. The document illuminating device according to claim 1, wherein the following conditional expression is satisfied:

$$0.018 < C/D < 0.050,$$

where C (mm) is the arrangement pitch of the plurality of curved reflecting surfaces, and D (mm) is the light path length from a reflecting point of a light beam on the curved reflecting surfaces to an image reading position on the document surface.

4. The document illuminating device according to claim 1, the curved reflecting surfaces are total reflection surfaces.

5. The document illuminating device according to claim 1, the curved reflecting surfaces are coated with a metal thin film having a reflectance of 70% or more.

6. An image reading apparatus comprising:
   the document illuminating device according to claim 1;
   a document table;
   a reading unit; and
   an imaging optical system that causes reading light beams reflected on the document surface to form an image on the reading unit.

7. A light guide optical system that guides a plurality of light beams emitted from a plurality of point light sources arranged linearly to a document surface, the light guide optical system comprising:
   an entrance surface through which the plurality of light beams emitted from the plurality of point light sources enter;
   a plurality of curved reflecting surfaces that reflect the plurality of light beams having passed through the entrance surface and that are periodically arranged in an arrangement direction of the plurality of point light sources; and
   an exit surface through which the plurality of light beams reflected on the plurality of curved reflecting surfaces exit toward the document surface;
   wherein each of the plurality of curved reflecting surfaces has a curvature in the arrangement direction of the plurality of point light sources, and an arrangement pitch of the plurality of curved reflecting surfaces periodically arranged in the arrangement direction of the plurality of point light sources is shorter than a spacing in a main scanning direction between the plurality of point light sources.

* * * * *